US006771644B1

(12) United States Patent
Brassil et al.

(10) Patent No.: US 6,771,644 B1
(45) Date of Patent: Aug. 3, 2004

(54) PROGRAM INSERTION IN REAL TIME IP MULTICAST

(75) Inventors: John Thomas Brassil, Los Gatos, CA (US); Sukesh Kumar Garg, Sayreville, NJ (US); Henning Gunther Schulzrinne, Leonia, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/398,979

(22) Filed: Sep. 17, 1999

(51) Int. Cl.[7] .............................................. G06F 15/16
(52) U.S. Cl. ........................ 370/390; 370/432; 370/529
(58) Field of Search ................................ 370/351, 352, 370/353, 354, 355, 356, 389, 390, 392, 432, 458, 465, 473, 487, 528, 527, 529; 709/236, 238; 725/40, 41, 42, 43, 44, 48

(56) References Cited

U.S. PATENT DOCUMENTS

| | | | | |
|---|---|---|---|---|
| 5,305,195 A | * | 4/1994 | Murphy | 364/401 |
| 5,854,897 A | * | 12/1998 | Radziewick et al. | 395/200.54 |
| 5,983,005 A | * | 11/1999 | Monteiro et al. | 395/200.61 |
| 6,006,257 A | * | 12/1999 | Slezak | 709/219 |
| 6,009,409 A | * | 12/1999 | Adler et al. | 705/14 |
| 6,160,585 A | * | 12/2000 | Schmidt et al. | 348/423 |
| 6,311,185 B1 | * | 10/2001 | Markowitz et al. | 707/10 |
| 6,351,467 B1 | * | 2/2002 | Dillon | 370/432 |

OTHER PUBLICATIONS

Cable Labs, Digital Program Insertion Request for Information.

* cited by examiner

Primary Examiner—Steven H. D Nguyen
Assistant Examiner—Duc Duong

(57) ABSTRACT

Program insertion in real time IP multicast enables the seamless insertion of a secondary program within an IP multicast session of a primary program. A primary content provider transmits its multimedia stream to a first proxy that transmits the data to a destination multicast session. A secondary content provider interested in inserting a program into that destination multicast session sends a request through a second proxy to the first proxy requesting a time slot to insert secondary program. The request includes the duration of the secondary program. The first proxy responds with a time slot or a denial of the request depending if a time slot is available. Assuming an available time slot, at the appropriate time the first proxy transfers control of the destination multicast session to the second proxy which transmits the secondary program. Upon completion of the secondary program the second proxy returns control of the session to the first proxy. All scheduling and control transfer occurs through the development of a new protocol to manage the transfer of control. Smooth transitions occur by manipulation of the RTP header in the packets and the associated RTCP stream.

20 Claims, 2 Drawing Sheets

PROGRAM INSERTION IN REAL TIME IP MULTICAST

FIELD OF THE INVENTION

The present invention relates generally to inserting a secondary audio and/or video program into a real time multicast of a primary audio and/or video program. In one specific embodiment the invention relates to the insertion of advertisements, into real time multicasts of audio and/or video over the Internet.

BACKGROUND OF THE INVENTION

With increased popularity and availability of the Internet, programmers, users and content providers are continuously searching for new applications of the Internet. One such application is real-time and near real-time audio and video transmitted over networks using the Internet Protocol (IP). With continued growth users will be able to view their television broadcasts and even listen to their radio programs over the Internet. While presently, the quality of the multimedia received over the Internet currently lags the quality that is received over more traditional medium, the technology is likely to soon rival existing audio/video broadcast technology.

Expanding Internet connectivity, network infrastructure improvements, and more powerful computers are all supporting this growth. Access technologies already under deployment, such as cable modems, promise enough downstream bandwidth to support real-time multimedia transport to residences. The software required to receive and render low-rate video conferences is now bundled with new personal computers or freely available (e.g., NetMeeting). Personal computers are being equipped with inexpensive native peripherals, such as DVDs, cameras, and frame grabbers, supporting content creation, capture, editing and transmission. New video standards such as MPEG-4 are also emerging and are expected to improve IP video quality. Carrier backbone transmission and switching equipment is being upgraded to keep up with increasing traffic demands and quality of service requirements. Thus growing network and computing capabilities suggest continued growth in real-time multimedia transport over IP networks.

Despite the considerable advances in network and end system technology, use of real-time IP multicast has grown at a relatively slow rate. Four reasons are typically cited for this limited growth: 1) limited available transmission bandwidth (particularly for residential users); 2) the predominance of packet loss at congested network routers; 3) the existing infrastructure's lack of a simple, scaleable multicast routing protocol; and 4) the lack of broadcast content for users to receive. The first two factors yield what is perceived as poor reception quality—for video in particular.

To address the immediate problem of poor reception, most content providers have steered clear of multicast transport. The overwhelming majority of audio content is unicast and streamed in near real time (i.e., up to a few seconds delay). This, notwithstanding that IP multicast is better suited for reaching larger audiences, exchanging certain types of personal information, and satisfying advertisers. In addition, exciting new services and opportunities are more easily achieved in a multicast setting. While packet loss recovery mechanisms in streaming transport protocols assure users of the highest quality reception, it comes at the expense of unicasting to each individual user to emulate a broadcast medium.

But, as discussed above, network infrastructure is being continuously upgraded, and routers and standards are being introduced to address existing network service quality deficiencies. These include the Reservations Protocol ("RSVP") and Differentiated Services ("DiffServ") which attempt to achieve quality of service, and Protocol Independent Multicast ("PIM") which attempts to achieve a scaleable multicast protocol described in S. Deering, et al., "The PIM Architecture for Wide Area Multicast Routing,: IEEE/ACM Transactions on Networking vol. 4 no. 2, pp. 153–62 (1996), hereby incorporated by reference as if fully set forth herein. As for lack of content, while little video is currently transmitted on the Internet, much content is potentially available. Much of this content is of interest to smaller audiences than would be efficiently targeted by other technologies such as broadcast radio or television. Hence, the technical barriers to growth in real-time multicast are being addressed, and all indications are that this trend will continue.

What limits further growth in IP multicasting, however, is the absence of a viable operational business model to justify an investment in broadcasting. Traditionally, advertisers pay for a time slot and provide a broadcaster with a pre-recorded tape of, or a disk containing an advertisement. While the content of television broadcasters can be either pre-recorded or televised live, the advertisements are broadcast by simply flipping a switch from the live camera or player feed of the feature presentation, to the player of the pre-recorded advertisement.

Streaming audio over the Internet can be expensive and presently audiences are typically small. While traditional television broadcasts and cable profit from advertisements, it is difficult to interest advertisers to pay for programs viewed by small audiences on the Internet. Clearly, solutions for effective and efficient insertion of advertisements or other programs during a real time presentation of a feature program serviced over the Internet are desired. Furthermore, a viable business model will lead to further desirable infrastructure improvements.

Consider a sporting event. The interested audience normally far exceeds the actual number of attendees. Event organizers recognize the potential value of broadcasting their content, but currently are unable to capture that value. Recording content for deferred, on-demand playback has little promise, since a sporting event's value diminishes rapidly as results become known. In some cases, organizers might consider a real-time broadcast on the multicast backbone (MBone),. A significant barrier here is that multicasting forces the organizers to make an initial and often substantial, up-front investment. Yet no practical mechanism exists to enable the content owners to be compensated for their expense. Event organizers seek assured funding to finance broadcasting and to ensure programming quality.

SUMMARY OF THE INVENTION

Accordingly, the present invention is a system and method for supporting audio/video program insertion in real-time IP multicasts. Secondary programs are seamlessly inserted into multicast sessions of primary programs in a decentralized fashion. Relying on coordination of nodes using the Real Time Protocol (RTP) and IP multicast, inserted video and/or audio programs are displayed within the same 'window' as the primary program regardless if the primary and secondary streams originate from physically distinct sources. If the inserted content is an advertisement, viewers have the familiar experience of commercial advertising on broadcast television.

In accordance with the present invention a primary content provider transmits its multimedia stream to a first proxy that transmits the data to a destination multicast session. A secondary content provider interested in inserting a program into that destination multicast session sends a request through a second proxy to the first proxy requesting a time slot to insert its secondary program. The request includes the duration of the secondary program. The first proxy responds with a time slot or a denial of the request depending if a time slot is available. Assuming an available time slot, at the appropriate time the first proxy transfers control of the destination multicast session to the second proxy which transmits the secondary program. Upon completion of the secondary program the second proxy returns control of the session to the first proxy. All scheduling and control transfer occurs through the development of a new protocol to manage the transfer of control. Smooth transitions occur by manipulation of the RTP header in the packets and the associated RTCP stream.

In accordance with the present invention, primary content providers, secondary content providers (e.g., advertisers) and viewers are afforded a far richer collection of relationships, opportunities and features than possible with traditional broadcast mediums. Thus for example spontaneous meetings and relationships between primary and secondary content providers may be established; program insertions may be set at arbitrary times from arbitrary locations in a multicast tree; verifiable viewer demographics from Real Time Control Protocol messages may be sent to content providers; and the system may support multiple, simultaneous program transmissions with user-selectable reception and viewing. In addition, operation of the system of the present invention does not require any modifications to existing software viewers or players.

Furthermore, the present invention is not dependent on IP being used from end-to-end, or that the network be public. Considerable applications of the system of the present invention exist outside of the Internet where IP multicast may be used on a more limited basis, such as with satellite distribution of audio/video feeds to "headends" for local internet or intranet distribution.

DETAILED DESCRIPTION OF THE INVENTION

Figure 1:
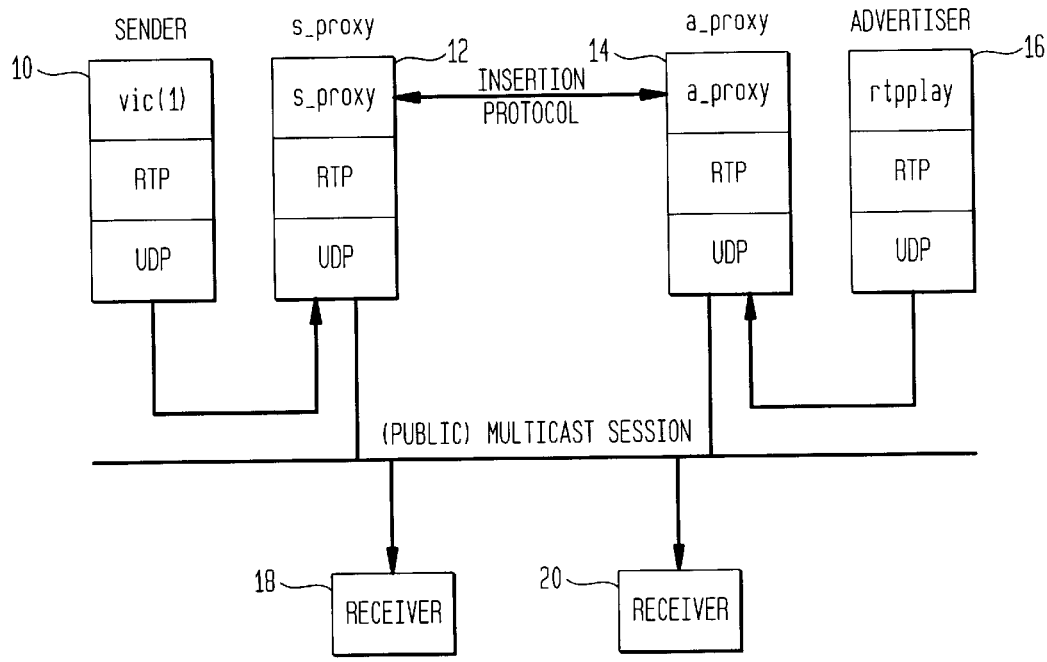
FIG. 1 depicts one instance of the general architecture of the program insertion system of the present invention.

One instance of the architecture of the program insertion system and method of the present invention is shown in FIG. 1. For ease of discussion the primary content provider is referred to as sender 10, while the secondary content provider is known as advertiser 16. In fact in accordance with the method and system of the present invention, the denotation of a content provider as primary and secondary is arbitrary. It merely simplifies the following discussion to refer to the provider of the principle program as primary and the provider of the inserted program as secondary. Since one common and advantageous embodiment of the present invention is to insert advertisements into a primary program, we refer to the secondary provider as the advertiser. Indeed, :a system for inserting commercial advertisements sets the foundation for a viable business model for television and radio over the Internet. However, it should be clear that the following discussion is not limited in scope to advertisement insertion. Further applications include insertion of emergency broadcasts, video chat sessions, and virtual radio/television stations. Indeed, the program insertion system of the present invention is operable with any application capable of sending and receiving RTP packets, or packets using an equivalent sending and receiving transport protocol which resides on the User Datgram Protocol ("UDP").

In accordance with the present invention proxies are associated with sender 10 and advertiser 16. Each proxy is responsible for broadcasting the content of their provider to receivers tuned to the destination multicast session. By using proxies, the method of the present invention is independent of multimedia viewers or players. Only one proxy forwards a Real Time Protocol ("RTP") stream (an Internet standard protocol for transporting continuous media) at any time. H. Schulzrinne, at al., "RTP: A Transport Protocol for Real-Time Applications," Internet RFC 1889 (January 1996), hereby incorporated by reference as if fully set forth herein.

The s_proxy 12 and a_proxy 14, which are servers, form client-server pairs with their respective providers that coordinate switching between the providers, the streams being transmitted to receivers 18 and 20. Each proxy (a_proxy 14 or s_proxy 12) software can be run on the same system as the content provider, (advertiser or sender, respectively) if desired. Unless otherwise indicated, the terms a_proxy 14 and s_proxy 12 as used herein refer to both the application software and the system running the software. The systems running the proxy software appear to the user to be the actual broadcast sources (as opposed to sender 10 and advertiser 16). s_proxy 12 provides two basic services: First, when an advertisement is not in progress, s_proxy 12 will continuously relay packets received on a private unicast, or a multicast session, from the sender 10 to the destination (public) multicast session. As discussed more fully below, RTP header fields are usually modified as part of the relay function. When an advertisement is in progress, s_proxy 12 interrupts the packet relaying process, permitting the advertiser's proxy, a_proxy 14 to transmit its own stream to the destination multicast session. The second service performed by s_proxy 12 is receiving and scheduling incoming requests for future advertisements. This task includes passing RTP header information to advertisers to permit them to inject advertisements seamlessly.

The content of either provider can be any audio and/or video, pre-recorded or live, encapsulated in RTP. However, if the program comprises both audio and video, it is advantageous to transmit them as separate RTP streams, handled by separate proxies.

Similar to the interaction of sender 10 with s_proxy 12, advertiser 16 ordinarily transmits packets to a_proxy 14 on a private unicast or multicast address and a_proxy 14 transmits the content of advertiser 16 on the destination multicast session. As with s_proxy 12, a_proxy 14 also provides two services: First, when an advertisement is in progress, it relays packets received from advertiser 16 to the destination multicast session, in which case RTP header fields are always modified, as explained below with reference to FIG. 2. When an advertisement is complete, a_proxy 14 terminates the packet relaying process. As part of this service, a_proxy 14 is also responsible for passing RTP header information back to the s_proxy 12 to permit a return to the primary content at the conclusion of the inserted program. Second, a_proxy 14 also schedules requests to place future advertisements and is responsible for properly handling denials of service (e.g. server responds that a desired time slot is unavailable) returned from the s_proxy 12.

Receivers 18 and 20 can be any destination capable of receiving and rendering audio/video in the encoding formats of both the sender and advertiser. The program insertion method and system of the present invention is independent of existing software players such as vic version 2.8, as described in S. McCanne and V. Jacobson, "vic: A Flexible Framework for Packet Video," Proceedings of ACM Multimedia '95 (November 1995), hereby incorporated by reference as if fully set forth herein, and vat version v4.0b2on Solaris 2.6; iCast Viewer version 2.0 on NT 4.0, as described in iCast Corp., iCast Viewer 3.0 Datasheet, http://www.icast.com/ (1998), hereby incorporated by reference as if fully set forth herein; or Precept Software's IP/TV demonstration version 2.0 on NT 4.0, as described in Precept Software (Cisco Systems), IP/TVViewer, http://www.cisco.com/warp/public/732/net_enabled/iptv/ (1998), hereby incorporated by reference as if fully set forth herein. Thus, some viewers may not require any change in order to operate with the present invention. FIG. 1 reflects one specific instance where a vic player is used by sender 10 and rtpplay is used by advertiser 16.

The final element of the architecture is the insertion protocol. This protocol comprises a set of messages sent between the a_proxy 14 and s_proxy12. The purpose of the protocol is to coordinate the transfer of a token; only the token holder is permitted to transmit packets on the destination multicast session. The protocol has three logical phases. During the scheduling phase a_proxy 14 communicates with s_proxy 12 to arrange an insertion at a future time. Control is passed to a_proxy 14 at that scheduled time during the transfer phase, and control is returned to s_proxy 12 when the insertion is complete during the return phase.

In one advantageous embodiment of the present invention sender 10 and advertiser 16 and their respective proxies 12 and 14 can be implemented in any combination of one or more machines. In another advantageous embodiment of the present invention the proxy functions could be integrated into the transmitting application of sender 10 and advertiser 16.

Figure 2:
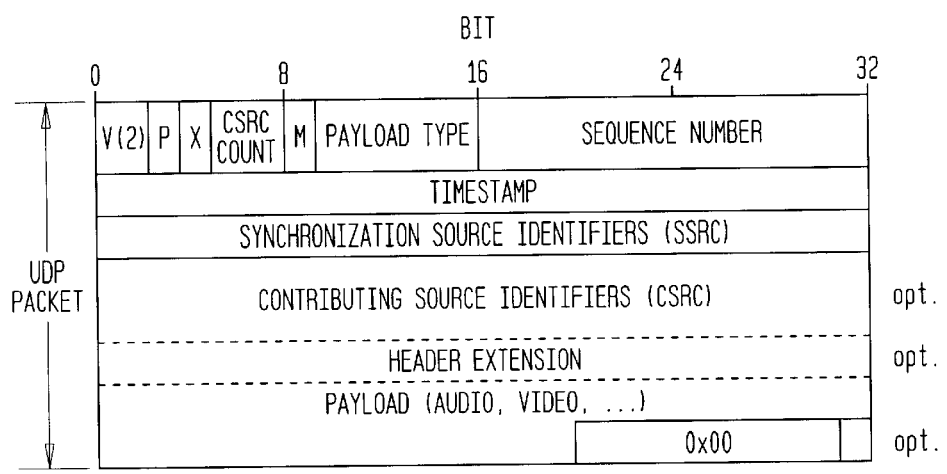
FIG. 2 illustrates a typical packet header in accordance with real time protocol version 2.

Referring to; the RTP header format shown in FIG. 2, the first twelve bytes of the header are required by the protocol. The synchronization source identifier (SSRC) is a random number which uniquely identifies the source of an RTP packet stream. Packets from a synchronization source are distinguished by a timestamp and sequence number. These fields are used by receivers for proper signal reconstruction and playout timing. The initial sequence number value is also random, and is incremented for each consecutively transmitted packet. Packets can and do arrive at their destination out-of-order.

The timestamp indicates the time of the sampling instant of the RTP payload relative to the initial timestamp value, which is randomly selected. The sampling rate for many audio/video encoding formats is constant, well known, and registered with the Interent Assigned Numbers Agency ("IANA"). Other formats can have time-varying sampling rates. Media formats are specified by the Payload Type (PT) field. Multiple packets can have the same timestamp, as in the case where a large video frame is grabbed, encoded, but then transported in multiple packets.

A list of contributing source identifiers is present only if multiple RTP streams have been mixed. In this case, the CSRC count (CC) field indicates the number of contributors, and the CSRC contains the original SSRC identifier of each contributing source.

Associated with RTP is a monitoring and control protocol called RTCP. RTCP's primary functions is to provide feedback on reception quality, and distribute source identification and control information. This is realized by distributing messages including Sender Reports (SR), Receiver Reports (RR), and Source Descriptions (SDES). A session's RTCP and RTP messages are ordinarily transmitted to separate ports on a shared destination multicast address.

To illustrate the operation of the insertion protocol of the present invention, consider an implementation of the present invention where the system injects programs on demand, i.e. without advance reservation. Advertiser 16, wishing to insert a secondary program contacts sender 10 immediately prior to insertion. Sender 10 may be transmitting an analog video signal captured from a live camera, encoded, packetized and transmitted as an RTP stream using vic, as shown in FIG. 1. An associated RTCP stream is transmitted on a different port. The RTP and RTCP streams are transmitted from sender 10 to s_proxy 12 and relayed from there to the destination multicast session.

s_proxy 12 controls and manages the process of forwarding the sender's RTP session to receivers 18 and 20 on the destination multicast session. This function includes receiving, manipulating and forwarding the RTP and RTCP packets. It also receives and processes the insertion request by advertiser 16, interrupting the relaying of the stream from sender 10 for the duration of the advertisement. Finally, it takes control of the RTP session at the advertisement termination time, and resumes relaying the stream from sender 10.

Figure 3:
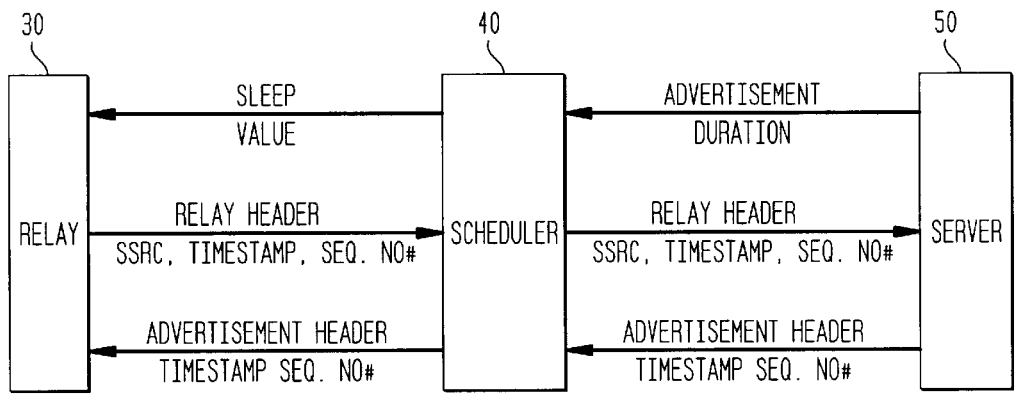
FIG. 3 illustrates the interprocess communication in the s_proxy as operated in accordance with the present invention.
Figure 4:
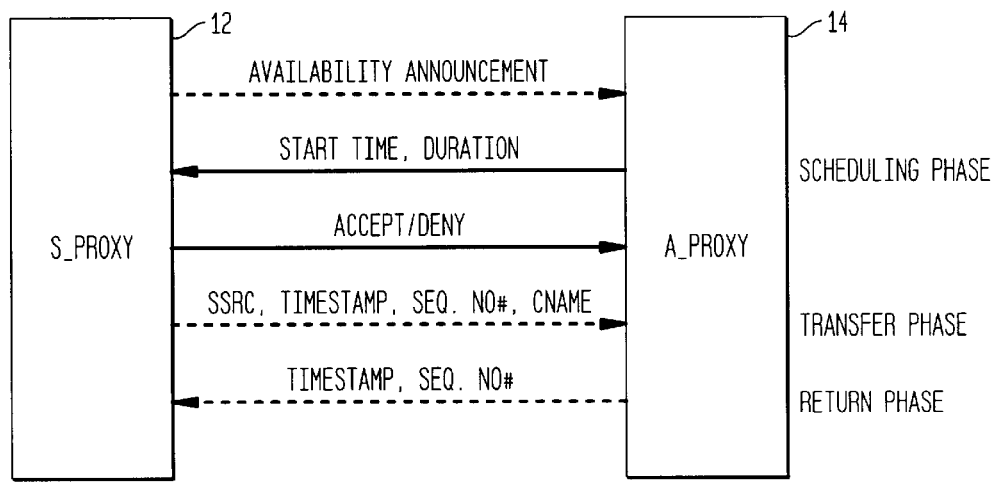
FIG. 4 illustrates an example of a program insertion protocol in accordance with the system of the present invention.

Referring to FIG. 3, the three separate tasks of s_proxy 12, relay, scheduler and server processes, are shown. The relay process 30 establishes a software interface for network communication, called a socket for receiving the sender's RTP stream, and a second socket for transmitting the modified stream to the receivers. The process stores the sender's SSRC, as well as the timestamp and sequence number of the last packet received. It also maintains an offset timestamp and offset sequence number. These values are initially zero but change according to the offset values returned by the advertiser. The offsets are added to the timestamp and sequence numbers field in the header of each incoming packet to be forwarded.

The server process 50 listens for a request from advertiser 16 on an incoming TCP connection. Each accepted connection creates a child server process. Information contained in a request is passed to the scheduler 40 using a queue structure. Advantageously the requests are queued and served on a first-come, first-serve basis as needed to handle multiple incoming insertion requests. This can be implemented using UNIX pipes for the interprocess communication. Each request from advertiser 16 contains the desired duration of the advertisement in seconds. Relaying the sender stream is stopped for the desired advertisement duration. At the end of the advertisement the server process receives current timestamp and sequence number values from advertiser 16 (on the still open TCP connection) and passes it to the relay process 30 to calculate new offsets.

The scheduling phase is necessarily message based. Advertiser 16 seeking to insert a program must explicitly contact s_proxy 12 with a desired program start time and duration. s_proxy 12 must explicitly accept or deny the request, although the response can optionally contain additional information. For example, if an insertion request is denied because of a scheduling conflict, s_proxy 12 could return alternate available time slots. Reliability demands suggest that this portion of the protocol should be TCP-based.

Thus the scheduler process 40 receives the incoming request from a server process and schedules an interrupt of the relay process. It is also possible, if desired, to make the scheduler a null process. This results in each insertion request immediately becoming an interrupt. The scheduler process receives the value of the advertisement duration from the server process 50 and informs the relay process 30 to sleep for the specified duration. At the end of the secondary program, new timestamp and sequence number values are received from the advertiser (through the scheduler process) and are passed to the relay process 30.

While in many instances the stream from a sender will be privately unicast to a single s_proxy, the system can support multicast to multiple s_proxies. As in broadcast television, it is desirable to permit multiple distributors of the same content, with each distributor having its own relations with advertisers. A typical use would be broadcasting an event of international interest (e.g., World Cup Soccer) with different agents assigned distribution rights by country. Different distributors could then cater to their own sets of advertisers, and their respective audiences.

By design, the implementation of a_proxy 14 is very similar to that of s_proxy 12. However, the scaling issues that arise for the s_proxy 12 (possibly needing to handle frequent incoming scheduling requests from many a_proxies) are not anticipated for a_proxy 14, permitting a simpler implementation. a_proxy 14 has a single process that does three jobs. First, it establishes a TCP connection to s_proxy 12 and requests an immediate time slot for program insertion. Only the intended secondary program duration is specified. For an immediate insertion, the SSRC and RTCP Session Description (SDES) parameters for sender 10 are returned, as well as the timestamp and sequence number of the most recently received sender packet. a_proxy 14 then calculates offsets for both timestamp and sequence number. That is, for seamless insertion, it is necessary for the stream transmitted by a_proxy 14 to pick up where the s_proxy 12 left off. This requires receiving the incoming advertiser's private stream, modifying RTP headers, and multicasting the modified stream on public destination multicast session.

Relaying the RTP stream from advertiser 16 begins immediately. For each incoming packet the advertiser's SSRC is changed to that of the s_proxy 12, and appropriate timestamp and sequence number offsets are added. At the completion of the secondary program transmission, a _proxy 14 sends back to s_proxy 12 its last transmitted packet's timestamp and sequence number. At this time, the s_proxy 12 calculates new timestamp and sequence number offsets, then begins relaying the signal from sender 10 once again, picking up where advertiser 16 left off.

Scheduling and control transfer phases can be implemented as coincident, or with arbitrary duration intervals between each phase. Note that in some applications scheduling insertions might be preceded by regular broadcast announcements of the availability of open time slots in a program schedule.

While scheduling requires explicit messaging, control transfer from s_proxy 12 to a_proxy 14 and control return from a_proxy 14 to s_proxy 12 can be implemented with implicit, or explicit messaging. In the implicit messaging model, no messages are sent between s_proxy 12 and a_proxy 14 during the control transfer and control return phases. Instead, it is assumed that both parties are time synchronized by a separate out-of-band mechanism such as the Network Time Protocol described in D. Mills, "Network Time Protocol (Version 3) Specification, Implementation & Analysis," Internet RFC 1305 (March 1992), hereby incorporated by reference as if fully set forth herein. This mechanism should be able to realize modestly precise time synchronization (e.g., 20 ms). This synchronized time is used by both a_proxy 14 and s_proxy 12 to determine when to start and stop relaying the respective content of advertiser 16 and sender 10. Each party monitors RTP packets on the destination session, and infers from this an appropriate timestamp and sequence number offset to use at the assumption of control.

For explicit messaging, several alternatives exist to transfer control. One option transmits two messages over a single TCP connection. These messages simply contain the RTP header of the last packet transmitted to the destination multicast session by the active proxy. This approach works well where immediate program insertion occurs upon request and s_proxy 12 and a_proxy 14 are geographically closely located.

A second embodiment uses messages based on the Real Time Streaming Protocol (RTSP) as described in H. Schulzrinne et al., "RTSP:A Transport Protocol for Real Time Applications," Internet Draft (February 1998), hereby incorporated by reference as if fully set forth herein. Existing RTSP methods (e.g., SETUP, PLAY) could be used to trigger playout of stored advertisements located on video servers. In this embodiment, sender's and advertisers' proxies operate in part as RTSP proxies. Control transfer messages between these proxies are based on existing (or extensions to existing) RTSP control messages.

For example, suppose an advertiser has scheduled a program insertion. Immediately prior to insertion time, the RTSP SETUP method could be used to pass transport parameters (e.g. SSRC, timestamp, sequence number) to the advertiser's proxy. At insertion time, the PLAY method would be sent by the sender's proxy to the advertiser's proxy to initiate advertisement playout. In this embodiment the communication between the sender and it's proxy, as well as the advertiser and its proxy, could also be performed using RTSP messages. For example, at a scheduled program insertion time, the sender's proxy could use the RTSP PAUSE method to interrupt the sender's communication, thus allowing the advertiser to insert content.

A third embodiment of explicit messaging requires the destination multicast session be monitored by s_proxy 12 and a_proxy 14. New RTCP application messages represent an explicit way to exchange necessary information to facilitate control transfer and return. In this embodiment, extensions to RTCP messages could serve as control transfer messages between sender and receiver proxies. Rather than using a separate communication channel (e.g. a TCP connection) between the proxies, the IP multicast session itself is used to transfer program control. For example, a new RTCP message could pass transport parameters (e.g. SSRC, timestamp, sequence number) from the sender's to the advertiser's proxy. This approach, however, is neither private (i.e., not unicast) nor reliable.

It is also possible to design a robust protocol by combining aspects of the foregoing three approaches. Deferred, remote playout could be triggered by an RTSP PLAY message sent in advance (e.g., several seconds or minutes) of a scheduled control transfer. Such a message would contain appropriate session control information (e.g. timestamp, sequence number and start time). In the event a deferred trigger message failed to arrive, advertiser 16 could simply monitor the session and estimate these parameters independently and begin when scheduled. In the worst case, advertiser 16 would begin only after detecting that active transmissions have ceased.

Selecting from these alternatives should be done with an eye toward the goal of achieving "seamless" switching between sender 10 and advertiser 16. Switching between video sources transmitting less than 30 frames/sec fortunately affords some leeway in both the timing of transmitted packets and the calculation of timestamp offsets.

Figure 5:
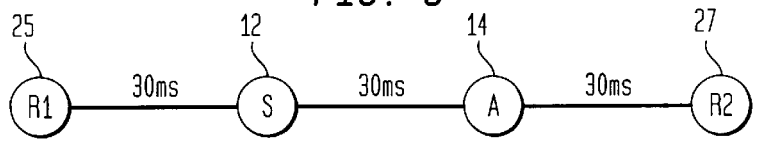
FIG. 5 illustrates a linear topology of a wide area network and the mean packet latency between various nodes therein between which the program insertion system of the present invention is implemented.

However, achieving seamless switching in a wide area setting requires consideration of the mean packet latency in the network. Consider the linear topology shown in FIG. 5 where two receivers, 25 and 27, are connected to a_proxy 14 and s_proxy 12 over links with specified mean packet latency. Suppose a_proxy 14 and s_proxy 12 are perfectly time synchronized, s_proxy 12 is to transfer control to a_proxy 14 which has the benefit of advance knowledge of the timestamp (time frame was captured), sequence number of packet and admission time (time packet was admitted in the network) of the last packet that s_proxy 12 will transmit.

If a_proxy 14 transmits its first packet at exactly the time s_proxy 12 would have transmitted its next packet, that first packet will nominally arrive late due to the additional delay in receiver 25. On the other hand, a_proxy's 14 first packet might arrive at receiver 27 before s_proxy's 12 final packet if the mean packet latency is not accounted for. If sender 10 and advertiser 16 are not precisely synchronized and a_proxy 14 poorly estimates the stamp and sequence number, duplicate packets may result, causing the receivers to discard one or more packets. Poorly estimated timestamps could easily produce unintended, perceptible freeze frame', if for example the timestamp increases from frame to frame so that the playback is very slow. Conversely, 'fast forward' play occurs where the timestamp decreases from frame to subsequent frame.

RTP requires that the identifiers be unique for each source in a session, and recommends actions for sources to take in the unlikely event of collision. Accordingly, the RTP header must be appropriately handled to assure display of the primary and secondary programs in the same window.

It is important to consider the handling of the RTCP messages which are critical to achieving the desired result. With respect to the data packet relayed by a proxy from provider to receiver, these two entities may be jointly owned or individually owned. Where the provider and proxy are jointly owned and operated by a single entity, the proxy could simply relay the provider's SDES and sender report (SR) messages, without modifying any identifying information (e.g. CNAME, EMAIL, PHONE, TOOL fields in SDES messages).

Other applications, however, require that a content provider and its proxy (or proxies) be distinguished, as for example, where a content provider and one or more broadcasters are entirely separate entities. Here, each proxy should transmit its own session description and sender report messages, rather than relay these messages received from the provider.

With respect to the relationship between the a_proxy and s_proxy, some applications such as advertisement insertion, editorial integrity and possibly legal and regulatory guidelines might require program and advertising content to be distinguishable by viewers. With other applications, however, a single broadcaster might wish to hide—or at least not call attention to—content being transmitted from distinct sources.

In accordance with one embodiment of the present invention this is accomplished by insuring both content providers share a single SSRC identifier if they are to share a single window in the viewer. Other embodiments as explained below relax this requirement, relying instead on intelligent viewers.

Similarly, current viewers will automatically open a second window upon receipt of an RTCP message containing a CNAME which is different from the CNAME associated with the RTP packet encapsulating the primary program. Thus proper handling of RTCP packets is necessary to assure the desired single window display. For example, it is possible to have the a_proxy modify and relay SDES messages from the advertiser so that they contain the same CNAME as any SDES messages issued by s_proxy. Some viewers, for example, the iCast viewer will accept this modification and perform the insertion with no difficulty. Other viewers, however, will recognize from the source IP address that the secondary program originated from a source different from the primary program and open a second window to display the secondary program. As applications such as program insertion become popular, uniform and proper handling of SSRC sharing among different viewers can be written into future versions of the RTP standard.

Meanwhile it is still possible to implement program insertion in accordance with the present invention with current viewers by spoofing IP addresses, a technique known in the art, which can always be performed by a separate software mixer/translator application program located at any receiver. Such tools are widely available in the public domain. One such example is RTP Trans, available at http://www.cs.columbia.edu/~hts/rtptools.

In accordance with the RTP specification the data payload may be of any encoding type that a viewer can decode. Thus content providers may use any standard format for their audio and/or video. However, the secondary content provider should ensure that, independent of any chosen encoding scheme, with respect to video, a full frame should be sent first (e.g., an I-frame in MPEG-2). This is a common recommendation for any video mixing system, as described in Cable Television Laboratories, Inc. "Digital Program Insertion: Request for Information," (April 1997), hereby incorporated by reference as if fully set forth herein.

This recommendation is easily realized in stored programs. However, achieving this becomes more difficult for "live" insertions, and also when returning control to "live" programming content. One possible solution is to have each proxy, upon receiving session control, discard video data until a full frame is received. This suffers however, in that switching between sources will take a longer, more variable period of time (e.g., perhaps ½ second before receiving the next I-frame in a typical MPEG sequence).

In accordance with the present invention as described above, several distinct advantages are enjoyed. First, the system is operable with existing transmitters and viewers.

Second, secondary content providers can efficiently transmit their own content, obviating any need for first forwarding their programs to event broadcasters. Moreover, since the secondary content providers are responsible for transmitting their own content event broadcasters are relieved from unwanted administration and retransmission tasks. Third, because the transport medium is a bidirectional multicast network, there is no need to impose topological restrictions on program insertion points. Fourth, despite the fact that the source of packets varies during a session, viewers see seamless transitions between primary and secondary content.

Fifth, advance scheduling of programs is not necessary because the secondary program is directly inserted by its owner (or proxy). Consequently, negotiating an insertion takes negligible time. Moreover, primary and secondary content providers should need no pre-existing relationship nor agreements. Furthermore, secondary content providers can tailor their insertions to current programming content, because spontaneous agreements can be realized. These advantages and others are not available with program insertion in either radio or television broadcasting.

A further advantageous embodiment of the present invention is to provide for the simultaneous transmission of different secondary programs, such as advertisements, to different viewers. With multiple secondary programs available it is even possible for individual users to customize their reception by choosing among the different transmissions, or even choosing no advertisements at all. This can be accomplished by allowing viewers to specify an SSRC mask. The mask is a 32 bit number logically AND'ed with each incoming packet's 32 bit SSRC value. If the result equals the SSRC value of the desired session, then the packet is accepted as belonging to that stream.

This approach effectively creates a set of SSRCs which can be used by advertisers to create separate. simulcast advertisement channels. For example, suppose receiver A has mask 0xffffff0f and receiver B has mask 0xfffffff0. Both receivers are tuned to a multicast session with SSRC identifier 0x55555500. Then, if during a 'commercial' break one advertiser begins transmitting with an SSRC identifier 0x55555501, this content will be accepted and played out by receiver B as a logical continuation of a programming sequence. If a second advertiser begins transmitting with an SSRC identifier 0x55555510, this content will be accepted and played out by receiver A. In the event of conflicts (i.e., multiple simultaneous streams with valid SSRCs), a conflict resolution procedure is invoked (e.g., packets with the lowest valid SSRC are played out, packets with other SSRCs are discarded).

It should be noted that masking would require coordination of SSRCs among content providers. In addition each receiver would have to learn of and specify its desired SSRC mask. One manner in which this can be accomplished is through a session directory listings for a session and its related secondary program sub-channels.

It should be obvious from the foregoing that back to back secondary programs are possible as well, much the same as multiple advertisements inserted during commercial breaks on radio and television. As requests for program insertion specify the length of the secondary program, the s_proxy is in a position to determine whether more than one request may be satisfied.

In a further advantageous embodiment of the present invention, it is possible to minimize the perceived time required to switch between two sources by properly estimating an observed RTP stream's time stamp and sequence number at a future time. In general, conservative overestimates of future sequence numbers are preferred because receiving an RTP stream with missing sequence numbers is less harmful than receiving duplicates. Estimating a future timestamp for an RTP stream with a unknown constant timestamp rate is trivial. For unknown constant timestamp rates, acceptable estimates can be readily obtained after observing the session for just a few seconds.

Returning to the plight of the sporting event organizers. With the ability for third parties to inject advertisements in real-time broadcasts, organizers now have a valuable commodity to sell—the 'dead' time in their programs. As we will see, the effort required is minimal and often simply an extension of what organizers are already doing by seeking industry sponsors and patrons. In the program insertion system of the present invention advertisers themselves are responsible for their ad production and insertion, freeing event organizers from involvement in re-broadcasting tasks. Advertisers would certainly seem to have considerable willingness-to-pay to place ads in content viewed by an audience with specific, identifiable and verifiable demographics. The additional revenues generated by advertising represent the assured funding required to enable organizers to broadcast a high quality production. These same revenues can indirectly contribute to network infrastructure improvement, since all parties are now interested in ensuring high quality viewer reception.

The foregoing merely illustrates the principles of the present invention. Those skilled in the art will be able to devise various modifications, which although not explicitly described or shown herein, embody the principles of the invention and are thus within its spirit and scope.

What is claimed is:

1. A computer implemented first proxy for relaying a first program from a program provider to a multicast destination address, comprising:

an input interface means for receiving data packets containing said first program from said program provider;

a transmitter for relaying said data packets to said multicast destination address;

interface means for transmitting header information to a second proxy for incorporation into the header of data packets forwarding a second program to said multicast destination address; and interface means for receiving header information from said second proxy for incorporation into the header of said data packets forwarding said first program to said multicast address.

2. The first proxy of claim 1 wherein said data packets are RTP data packets.

3. The first proxy of claim 1 wherein said first proxy is a primary proxy said second proxy is a secondary proxy, said first program is a primary program and said second program is a secondary program, said primary proxy further comprising:

interface means for receiving a request from said secondary proxy to transmit said secondary program of a given duration to said multicast destination address;

computer implemented means for determining the availability of a time slot for said secondary program;

interface means for responding to said secondary proxy with a time slot, if available, or a denial of said request; and computer implemented means for interrupting said continuous relay of said primary program at the scheduled time for transmitting said secondary program.

4. The first proxy according to claim 1 wherein said first proxy is a secondary proxy, said second proxy is a primary proxy, said first program is a secondary program and said second program is a primary program, said secondary proxy further comprising:

an interface means for transmitting a request to said primary proxy to transmit a secondary program of a given duration to said multicast destination address.

5. A computer implemented method for seamless insertion of a secondary program to a multicast destination address during a pause in the transmission of a primary program to said multicast destination address, said method comprising the steps of:

establishing a first software interface for communication between a provider of said primary program and a primary proxy;

said primary proxy receiving said primary program from said primary program provider, said primary program packetized into at least one data packet;

establishing a second software interface for communication between said primary proxy and a multicast destination address for relaying said primary program to at least one user at said multicast destination address;

relaying said primary program on said multicast destination address;

said primary proxy receiving a request from a secondary proxy to transmit to said multicast destination address a secondary program which is packetized into at least one data packet, said secondary program having a given duration;

interrupting said relay of said primary program to transmit said secondary program;

transmitting said secondary program to said multicast destination address; and continuing said relay of said primary program to said multicast destination address.

6. The method of claim 5 further comprising the steps of:

prior to transmitting said secondary program, said primary proxy transmitting primary header information to said secondary proxy for incorporation into the header of said data packets of said secondary program; and upon completion of said transmission of said secondary program, said secondary proxy transmitting secondary header information to said primary proxy for incorporation into the header of said data packets of said primary program.

7. The method of claim 6 wherein said primary header information includes a synchronization source identifier corresponding to said primary program provider, a time stamp and a packet sequence and said secondary header information includes a time stamp and a packet sequence, said method further comprising the steps of:

said primary proxy storing said synchronization source identifier of said primary program provider, said time stamp and said packet sequence of the last data packet relayed to said multicast destination address before said scheduled time for transmitting said secondary program;

said secondary proxy using said primary header information to adjust said time stamp and packet sequence of said data packets of said secondary program so that said data packets of said secondary program are transmitted to said multicast destination address, seamless with said primary program; and at the expiration of the duration of said secondary program, said primary proxy using said secondary header information to adjust said time stamp and packet sequence of the first data packet of said primary program following said pause in said transmission of said primary program so that said first data packet is transmitted to said multicast destination address, seamless with said secondary program.

8. The method of claim 5, further comprising the steps of:

said secondary proxy monitoring the traffic from said primary proxy on said multicast destination address to determine primary header information of the last data packet of said primary program prior to said interrupting step; and said primary proxy monitoring the traffic from said secondary proxy on said multicast destination address to determine secondary header information of the last data packet of said secondary program and to determine when said secondary proxy has stopped transmitting said secondary program.

9. The method of claim 8 wherein said primary header information includes a synchronization source identifier corresponding to said primary program provider, a time stamp and a packet sequence and said secondary header information includes a time stamp and a packet sequence, said method further comprising the steps of:

said primary proxy storing said synchronization source identifier of said primary program provider, said time stamp and said packet sequence of the last data packet relayed to said multicast destination address before said scheduled time for transmitting said secondary program;

said secondary proxy using said primary header information to adjust said time stamp and packet sequence of said data packets of said secondary program so that said data packets of said secondary program are transmitted to said multicast destination address, seamless with said primary program; and at the expiration of the duration of said secondary program, said primary proxy using said secondary header information to adjust said time stamp and packet sequence of the first data packet of said primary program following said pause in said transmission of said primary program so that said first data packet is transmitted to said multicast destination address, seamless with said secondary program.

10. The method of claim 5 wherein said communications between said primary proxy and said secondary proxy is conducted over a private TCP connection.

11. The method of claim 5 wherein said communications between said primary proxy and said secondary proxy is conducted using RTCP messaging.

12. The method of claim 5 wherein said communications between said primary proxy and said secondary proxy is conducted using RTSP messaging.

13. The method of claim 5 further comprising the steps of:

upon receipt by said primary proxy of said request from said secondary proxy, said primary proxy determining the availability of a time for inserting said secondary program; and responding to said secondary proxy with a scheduled time for transmitting said secondary program if available, or a denial of said request.

14. The method of claim 7 further comprising the step of said secondary proxy replacing said synchronization source identifier of said secondary program provider found in each data packet of said secondary program, with said synchronization source identifier of said primary program provider.

15. The method of claim 9 further comprising the step of said secondary proxy replacing said synchronization source identifier of said secondary program provider found in each data packet of said secondary program, with said synchronization source identifier of said primary program provider.

16. The method according to claim 5 wherein said primary and secondary programs are transmitted in accordance with the Real Time Protocol and under the control of the Real Time Control Protocol and wherein transmitting said token from said first proxy to said second proxy includes transmitting the last time stamp and sequence number from the header of a Real Time Protocol stream associated with said primary program and wherein said returning token step includes transmitting the last time stamp and sequence number from said secondary program.

17. The method according to claim 5 wherein said primary and secondary programs are displayed to a user at said multicast destination address on a single viewer window.

18. The method according to claim 5 wherein demographic data from said users at said multicast destination address is transmitted via a Real Time Control Protocol message to said-secondary proxy.

19. The method of claim 7 wherein a plurality of secondary program providers, each with a unique synchronization source identifier and a unique secondary program are transmitting on said multicast destination address, further comprising the steps of:

a viewer tuned to said multicast destination address selecting a synchronization source identifier mask of one of said unique synchronization source identifiers; and selecting one of said plurality of secondary programs by accepting data packets having a synchronization source identifier that matches with said synchronization source identifier mask.

20. The method of claim 7 wherein a plurality of secondary program providers, each with a unique synchronization source identifier and a unique secondary program are transmitting on said multicast destination address, further comprising the steps of:

a viewer tuned to said multicast destination address, selecting a synchronization source identifier mask of one of said unique synchronization source identifiers; and selecting one of said plurality of secondary programs by accepting data packets having a synchronization source identifier that matches with said synchronization source identifier mask.

* * * * *